(12) United States Patent (10) Patent No.: US 12,174,362 B1
Hou et al. (45) Date of Patent: Dec. 24, 2024

(54) MICROSCOPIC IMAGING SYSTEM AND MICROSCOPIC IMAGING METHOD FOR SAMPLE ANGLE RECOGNITION

(71) Applicant: SHENZHEN BAY LABORATORY, Guangdong (CN)

(72) Inventors: Shangguo Hou, Guangdong (CN); Haoyang Li, Guangdong (CN); Xiufeng Zhang, Guangdong (CN); Dongping Zhong, Guangdong (CN)

(73) Assignee: SHENZHEN BAY LABORATORY, Shenzhen (CN)

( * ) Notice: Subject to any disclaimer, the term of this patent is extended or adjusted under 35 U.S.C. 154(b) by 0 days.

(21) Appl. No.: 18/803,853

(22) Filed: Aug. 14, 2024

(30) Foreign Application Priority Data

Aug. 15, 2023 (CN) .......................... 202311020204.7

(51) Int. Cl.
*G01N 21/64* (2006.01)
*G02B 21/16* (2006.01)
*G02B 21/36* (2006.01)
*G02F 1/01* (2006.01)

(52) U.S. Cl.
CPC ....... *G02B 21/365* (2013.01); *G01N 21/6458* (2013.01); *G02B 21/16* (2013.01); *G02F 1/0136* (2013.01); *G01N 2021/6465* (2013.01); *G01N 2201/0683* (2013.01)

(58) Field of Classification Search
None
See application file for complete search history.

(56) References Cited

U.S. PATENT DOCUMENTS

| 8,477,308 | B1 * | 7/2013 | Haycraft | ................ | G01N 21/41 356/369 |
| 2005/0068529 | A1 * | 3/2005 | Montarou | ................. | G01J 4/00 356/364 |
| 2012/0018651 | A1 * | 1/2012 | Hess | ................... | G02B 21/0088 359/385 |

(Continued)

FOREIGN PATENT DOCUMENTS

| CN | 106290284 A | 1/2017 |
| CN | 110849849 A | 2/2020 |

(Continued)

OTHER PUBLICATIONS

Notice of Allowance of counterpart Chinese Patent Application No. 202311020204.7 issued on Sep. 20, 2023.

*Primary Examiner* — David P Porta
*Assistant Examiner* — Djura Malevic (57) ABSTRACT

Discloses are a microscopic imaging system and a microscopic imaging method for sample angle recognition. Firstly, a polarization rotation device introduced in an optical path of an excitation light can polarize and modulate the excitation light so as to make a polarization-modulated excitation light to rotate in a preset angle range; secondly, the polarization-modulated excitation light can be splitted into two parts via a beam splitting device, one for sample imaging, and the other for detection of polarization; and finally, a plurality of model characteristic curves can be obtained by a polarization detection device, each of the model characteristic curves corresponding to one angle, thus determining an angle information about an object to be analyzed in the sample.

11 Claims, 4 Drawing Sheets

(56) References Cited

U.S. PATENT DOCUMENTS

| | | | | |
|---|---|---|---|---|
| 2013/0162996 A1* | 6/2013 | Straaijer | ............ | G03F 7/70633 356/369 |
| 2017/0135625 A1* | 5/2017 | Varghese | ................ | A61N 1/40 |
| 2019/0187612 A1* | 6/2019 | Sato | .................. | G03H 1/0443 |

FOREIGN PATENT DOCUMENTS

| | | |
|---|---|---|
| CN | 113835207 A | 12/2021 |
| CN | 115753717 A | 3/2023 |

\* cited by examiner

MICROSCOPIC IMAGING SYSTEM AND MICROSCOPIC IMAGING METHOD FOR SAMPLE ANGLE RECOGNITION

CROSS REFERENCE TO RELATED APPLICATIONS

The present application claims the benefit of Chinese Patent Application No. 202311020204.7 filed on Aug. 15, 2023, the contents of which are incorporated herein by reference in their entirety.

TECHNICAL FIELD

The present disclosure relates to microscopic imaging, in particular to microscopic imaging systems and microscopic imaging methods for recognizing angles of samples.

BACKGROUND OF THE INVENTION

The rapid development of microscopic imaging technology has greatly promoted the progress of many fields such as life science and material science in recent years. Optical microscopic imaging technology, due to its nondestructive, specific and high spatio-temporal resolution, has become an important tool to study micro-scale characteristics in various fields. For example, a fluorescence microscope can observe subcellular level spatial resolution and millisecond level temporal resolution by studying biological samples through fluorescence probes. However, the ability to characterize complex biological systems by fluorescence intensity information alone is limited. For example, when studying the aggregation process of alpha-synuclein that causes Parkinson's disease, it is not possible to distinguish regions with high expression of non-protein aggregation from regions with protein aggregation by fluorescence intensity alone. Preformed non-clustered and clustered regions can be distinguished by two-dimensional polarization angle imaging. In addition, the introduction of polarization angle modulation can also realize the development of super-resolution microscopic imaging technology. Therefore, it is of great significance to develop microscopic imaging technology with polarization angle resolution on the basis of traditional optical microscopes to study the properties of complex biological systems.

As one of the common materials at the microscopic scale, metal nanomaterials have played an important role in many scientific fields since emergence. In the field of biology and medicine, metal nanomaterials can be used in many aspects such as biosensors, drug delivery, medical or biological imaging, and photothermal therapy. For example, the study of the translational and rotational dynamics of metal nanorods on cell membranes in combination with biosensors and bioimaging technology is of great significance for understanding cellular mechanisms and advancing biotechnologies such as drug release, photothermal therapy, and immunotherapy. Metal nanorods, metal nanomaterials commonly used in the study of biological systems, are usually non-fluorescent and need to be imaged and localized by dark-field microscopy or differential interference contrast microscopy. In addition, in order to meet special research purposes and methods, its size is generally designed to be 100 nm or even smaller, which seriously exceeds the resolution limit of traditional optical microscopes. It is difficult to accurately characterize the angular distribution of metal nanorods only by field microscopy and differential interference contrast microscopy. The characterization methods for the morphology of metal nanorods at present are scanning electron microscopy, transmission electron microscopy and atomic force microscopy. Although these microscopy techniques have extremely high spatial resolution, they are difficult to apply to the dynamic study of biological samples, especially living cells. Moreover, due to the high cost, high technical difficulty and complex realization principle of electron microscopes, their popularization and applicability to researchers in different fields such as biologists and medical experts are poor. According to the characteristics of metal nanorods that the absorption capacities for specific wavelengths of polarized light are different with the long and short axes thereof, some researchers have attempted to develop imaging methods with angle resolution based on optical microscopy. In addition to recognizing the angles of metal nanorods, these methods can also effectively identify the angle information of samples that have selective response to polarized light. In some existing technologies, with the combination of traditional optical microscopy and polarization imaging techniques, the translation and rotation diffusion of metal nanorods on cell membranes can be successfully realized, as well as the differentiation between alpha-synuclein aggregation region and high expression region, and the development of polarization modulation super-resolution fluorescence microscopic imaging. These studies can well characterize the fine structure and dynamic interaction of cells to reveal the dynamic mechanism of cells in another dimension. In short, the development of optical microscopic imaging technology with angle resolution will promote the progress and development of many fields such as life science and materials science.

However, many existing polarization imaging schemes still have defects such as complex optical systems, expensive equipment, and difficult imaging data analysis.

SUMMARY OF THE INVENTION

The present disclosure provides microscopic imaging systems and microscopic imaging methods for sample angle recognition, which can accurately identify the angles of samples, and the imaging system has simple structure and low difficulty in data analysis.

According to a first aspect of the present disclosure, a microscopic imaging system provided in some embodiments may include:
- an object stage for carrying a sample, wherein an object to be analyzed in the sample having a polarized light response;
- a light source for providing an excitation light to excite the sample;
- a polarization rotation device for modulating a polarization angle of the excitation light to obtain a polarization-modulated excitation light, a polarization angle of the polarization-modulated excitation light being changed continuously and cyclically within a preset angle range;
- a beam splitting device for splitting the polarization-modulated excitation light into two parts including a first excitation light and a second excitation light;
- an imaging device for detecting an intensity of fluorescence or reflected light emitted by the object to be analyzed in the sample after being excited by the first excitation light, the intensity of fluorescence or reflected light being related to a polarization angle of the first excitation light; and
- a polarization detection device for detecting change information about a polarization angle of the second excitation light to obtain polarization change information of the polarization-modulated excitation light.

According to a second aspect of the present disclosure, a microscopic imaging method for sample angle recognition (i.e. a microscopic imaging method for recognizing angles of samples) provided in some embodiments, which is applied to the microscopic imaging system mentioned in the above embodiments, may include:

modulating a polarization angle of the excitation light emitted by the light source and outputting a polarization-modulated excitation light, a polarization angle of the polarization-modulated excitation light being changed continuously and cyclically within a preset angle range;

obtaining from the imaging device the detected intensity of fluorescence or reflected light emitted by the object to be analyzed in the sample after being excited by the first excitation light to obtain a sample characteristic curve;

in a case of the second polarizer being at different polarization angles, obtaining from the polarization detection device the detected change information about the polarization angle of the second excitation light so as to obtain a plurality of model characteristic curves, the model characteristic curves being corresponding to the polarization angles of the second polarizer one by one; and calculating an error between each of the model characteristic curves and the sample characteristic curve, taking a polarization angle corresponding to a model characteristic curve with a minimum error with the sample characteristic curve as angle information about the object to be analyzed in the sample, and outputting the angle information about the object to be analyzed in the sample.

According to the microscopic imaging system and the microscopic imaging method for sample angle recognition in above embodiments, firstly, the polarization rotation device introduced in the optical path of the excitation light can polarize and modulate the excitation light so as to make the polarization-modulated excitation light to rotate in a preset angle range; secondly, the polarization-modulated excitation light can be splitted into two parts via the beam splitting device, one for subsequent sample imaging, and the other for polarization and detection so as to detect the change information about the polarization angle of the polarization-modulated excitation light; and finally, a plurality of model characteristic curves can be obtained by the polarization detection device, each of the model characteristic curves corresponding to one angle, the error between the model characteristic curve and the sample characteristic curve obtained by sample imaging can be calculated and compared, and the angle corresponding to the model characteristic curve with the smallest error with the sample characteristic curve can be taken as the angle information about the object to be analyzed in the sample, thus determining the angle information about the object to be analyzed in the sample.

DETAILED DESCRIPTION

The present disclosure is further described in detail below through specific embodiments in combination with the drawings, wherein, similar elements in different embodiments adopt associated similar element labels. In the following embodiments, many details are described in order to make the application be better understood. However, those skilled in the art can easily realize that some features can be omitted in different cases or can be replaced by other elements, materials and methods. In some cases, some operations related to the present disclosure are not shown or described in the specification in order to avoid the core part of the present disclosure being overwhelmed by excessive descriptions, and for those skilled in the art, it is not necessary to describe these relevant operations in detail, they can completely understand the relevant operations according to the description in the specification and the general technical knowledge of the field.

In addition, the features, operations or characteristics described in the specification may be combined in any appropriate manner to form various embodiments. At the same time, the steps or actions described in the method may be sequenced or adjusted in a manner apparent to those skilled in the art. Therefore, the sequences in the specification and the drawings are intended to clearly describe an embodiment and are not meant to be a required sequence unless it is indicated otherwise that a sequence must be followed.

The serial numbers assigned to the parts in the present disclosure, such as "first", "second", etc., are only used to distinguish the described objects, and do not have any sequential or technical meaning. The terms "connect" and "couple" as mentioned in the present disclosure, unless otherwise specified, include direct and indirect connection (coupling).

With the embodiments of the present disclosure, firstly, the polarization rotation device introduced in the optical path of the excitation light can polarize and modulate the excitation light so as to make the polarization-modulated excitation light to rotate in a preset angle range; secondly, the polarization-modulated excitation light can be splitted into two parts via the beam splitting device, one for subsequent sample imaging, and the other for polarization and detection so as to detect the change information about the polarization angle of the polarization-modulated excitation light; and finally, a plurality of model characteristic curves can be obtained by the polarization detection device, each of the model characteristic curves corresponding to one angle, the error between the model characteristic curve and the sample characteristic curve obtained by sample imaging can be calculated and compared, and the angle corresponding to the model characteristic curve with the smallest error with the sample characteristic curve can be taken as the angle information about the object to be analyzed in the sample, thus determining the angle information about the object to be analyzed in the sample.

Figure 1:
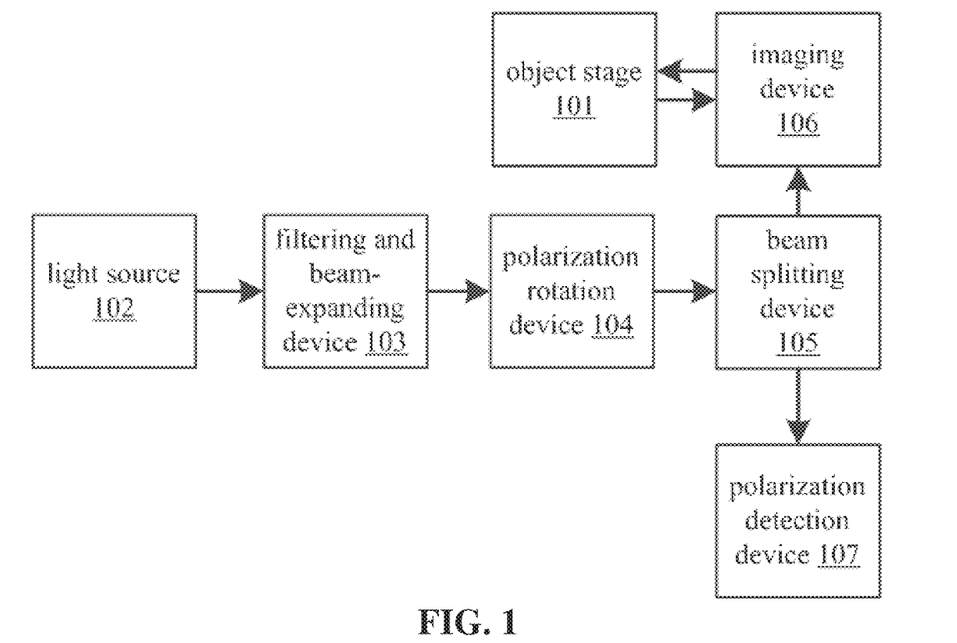
FIG. 1 is a schematic diagram of the structure of a microscopic imaging system in some embodiments of the present disclosure.

Please refer to FIG. 1. A microscopic imaging system provided in some embodiments of the present disclosure may include an object stage 101, a light source 102, a filtering and beam-expanding device 103, a polarization rotation device 104, a beam splitting device 105, an imaging device 106 and a polarization detection device 107, which are described in detail below.

The object stage 101 may be configured to carry a sample; and an object to be analyzed in the sample may have a polarized light response. The object to be analyzed having a polarized light response means that the object to be analyzed emits light with different light intensities after being excited by polarized light with different polarization angles, and information about the light intensity after excitation may be analyzed to determine some information about the object to be analyzed. For example, taking a typical sample metal nanorod with the polarized light response as an example, the spatial angle information of the metal nanorod can be analyzed by detecting the scattering signal of the metal nanorod under polarization modulated illumination, thus obtaining change information about the surrounding environment thereof.

In some embodiments, the sample may be the one containing a metal nanorod, the one containing a fluorescent molecule, or the one with a polarization response.

The light source 102 may be configured to provide an excitation light for exciting the sample. The light source 102 in the shown embodiment may be a laser which can generate continuous laser with different wavelengths.

The filtering and beam-expanding device 103 may be arranged on the optical path between the light source 102 and the polarization rotation device 104, and may be configured to filter and expand the excitation light emitted by the light source 102. In order to improve the quality of a light spot, the excitation light emitted by the light source 102 may be filtered and expanded.

The polarization rotation device 104 may be configured to modulate the polarization angle of the excitation light after being filtered and expanded to obtain a polarization-modulated excitation light; and the polarization angle of the polarization-modulated excitation light may be changed continuously and cyclically within a preset angle range. That is, the excitation light emitted by the light source 102 may be modulated into the excitation light with a polarization rotation within a preset angle range, wherein the polarization rotation within the preset angle range may be rotated at equal intervals or at non-equal intervals.

The beam splitting device 105 may be configured to split the polarization-modulated excitation light into two parts including a first excitation light and a second excitation light. It should be noted that the two excitation lights may have the same information about the polarization angle.

The imaging device 106 may be configured to detect the intensity of fluorescence or reflected light emitted by the object to be analyzed in the sample after being excited by the first excitation light; wherein the intensity of fluorescence or reflected light may be related to the polarization angle of the first excitation light. It shall be noted that the object to be analyzed in the shown embodiment may be divided into two categories: one is the metal nanorods in the sample, which may emit reflected light after being excited by the first excitation light; and the other is the fluorescent molecules in the sample, which may emit fluorescence after being excited by the first excitation light. In some embodiments, the fluorescence or reflected light emitted after excitation may reach the camera after being transmitted through the optical path for imaging.

The polarization detection device 107 may be configured to detect the change information about the polarization angle of the second excitation light, so as to obtain the polarization change information of the polarization-modulated excitation light. Since the second excitation light may have the same information about the polarization angle as the first excitation light, the change information about the polarization angle of the first excitation light for imaging can be obtained by detecting the change information about the polarization angle of the second excitation light.

Figure 2:
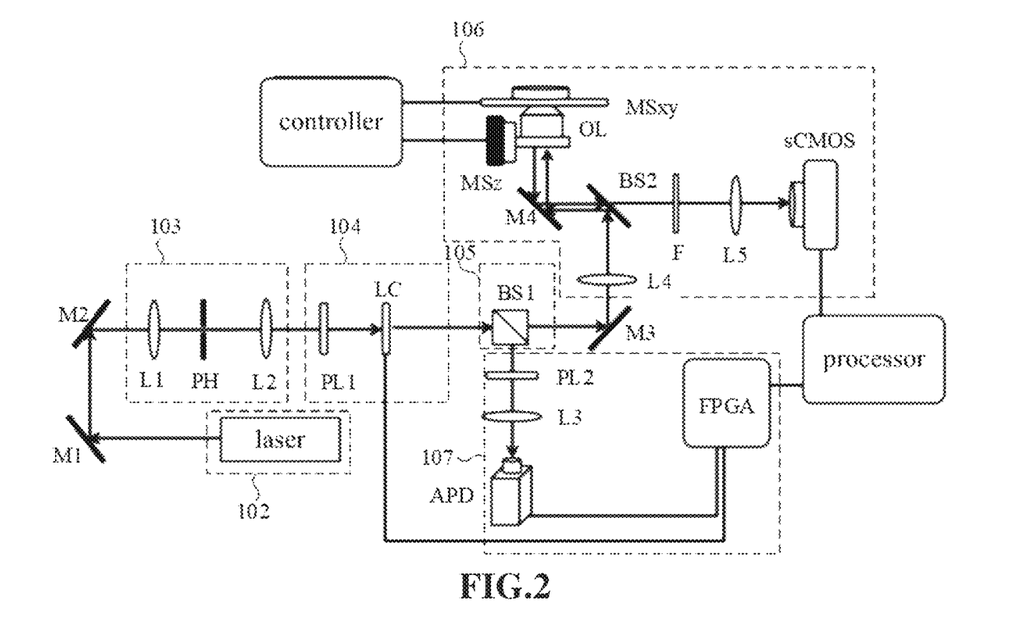
FIG. 2 is a schematic diagram of the optical structure of a microscopic imaging system in some embodiments of the present disclosure.

Based on each module of the microscopic imaging system, please refer to FIG. 2, a specific optical structure diagram for microscopic imaging of metal nanorods in the sample is also provided in some embodiments of the present disclosure.

The laser may generate continuous laser with different wavelengths, which can meet the observation requirements of metal nanorods with different sizes. In the shown embodiment, the laser generated by the laser is the excitation light provided by the light source 102.

The excitation light generated by the laser may be reflected by two reflectors (M1, M2) to reach the filtering and beam-expanding device 103. The filtering and beam-expanding device 103 may include a first lens L1, a second lens L2 and an optical aperture, which may be used to filter and expand the excitation light generated by the laser to improve the quality of the light spot.

After being filtered and expanded, the excitation light may reach the polarization rotation device 104. The polarization rotation device 104 may include a first polarizer PL1 and a polarization rotator LC. By adjusting the polarization angle of the first polarizer PL1, the polarization direction of the excitation light of the first polarizer PL1 may match the optical axis direction of the polarization rotator LC, thus maximizing the polarization modulation function of the polarization rotator LC. The polarization rotator LC may be configured to modulate the polarization angle of the excitation light according to the magnitude of the electrical signal applied thereto, so that the polarization angle of the polarization-modulated excitation light can be changed continuously and cyclically within a preset angle range; wherein, the polarization angle of the excitation light may be in an increasing manner according to the magnitude of the electrical signal applied from small to large, and the electrical signal may include a square wave signal or a DC voltage signal. In this way, after the excitation light is passed through the first polarizer PL1 and then the polarization rotator LC for polarization modulation, the excitation light with polarization rotation within the preset angle range can be obtained.

The polarization-modulated excitation light then passing through the beam splitting device 105 may be divided into two parts. The beam splitting device 105 may include a non-polarized beam splitter BS1 which can divide the excitation light into two beams, i.e. the first excitation light and the second excitation light, without destroying the polarization state of the excitation light.

The first excitation light may reach the imaging device 106 through a reflector M3 for microscopic imaging of the sample. The imaging device 106 may include a fourth lens L4, a non-polarized beam splitter BS2, a reflector M4, an objective lens OL, a z-axis micron-scale displacement platform MSz, an xy-axis micron-scale displacement platform MSxy, a filter F, a fifth lens L5 and a camera sCMOS. After successively passing through the fourth lens L4, the non-polarized beam splitter BS2, the reflector M4 and the objective lens OL, the first excitation light may irradiate the sample in a wide field form to excite the metal nanorod in the sample to emit reflected light. The reflected light may then pass through the reflector M4, the non-polarized beam splitter BS2, the filter F and the fifth lens L5 to be collected by the camera sCMOS on which the dynamic change in the light intensity of the light reflected by the sample may be recorded. In some embodiments, the z-axis micron-scale displacement platform MSz and the xy-axis micron-scale displacement platform MSxy may be controlled by a controller, and the camera sCMOS may be a high-speed camera. It should be noted that the imaging device 106 is the structure of an imaging optical path of the existing microscopic imaging system, and the specific principle of which will not be described herein.

The polarization change of the second excitation light may be detected by the polarization detection device 107. Since the second excitation light has the same polarization change as the first excitation light, the polarization detection device 107 may also detect the polarization change of the first excitation light. The polarization detection device 107 may include a second polarizer PL2, a third lens L3, an avalanche photodiode APD and a field programmable gate array FPGA, wherein the second polarizer PL2 may be configured to assist the avalanche photodiode APD to detect the light intensity of the second excitation light.

In some embodiments, as the polarization direction of the second excitation light is changed from being parallel to perpendicular to the polarization direction of the second polarizer PL2, the light intensity of the second excitation light after passing through the second polarizer PL2 may be changed from maximum to minimum. That is, when the polarization direction of the second excitation light is parallel to the polarization direction of the second polarizer PL2, the light intensity of the second excitation light passing through the second polarizer PL2 may have a maximum value; and when the polarization direction of the second excitation light is perpendicular to the polarization direction of the second polarizer PL2, the light intensity of the second excitation light passing through the second polarizer PL2 may have a minimum value.

The third lens L3 may be configured to focus the second excitation light after passing through the second polarizer PL2 onto the center of the avalanche photodiode APD.

The avalanche photodiode APD may be configured to convert the change information of the light intensity of the second excitation light after passing through the second polarizer PL2 into the corresponding electrical signals with polarization angle information. Since the second excitation light is polarized rotating light, during passing through the second polarizer PL2, when the polarization direction of the second excitation light is parallel to the polarization direction of the second polarizer PL2, the light intensity detected by the avalanche photodiode APD may be the largest, and when the polarization direction of the second excitation light is perpendicular to the polarization direction of the second polarizer PL2, the light intensity detected by the avalanche photodiode APD may be the smallest. In this way, with the polarization rotation of the second excitation light, the light intensity detected by the avalanche photodiode APD may change dynamically. Since the light intensity is related to the polarization angle, the dynamic change information of the polarization angle of the second excitation light can be detected.

The field programmable gate array FPGA may be configured to read and record the electrical signal with polarization angle information, and determine the change information about the polarization angle of the second excitation light.

In addition, since the polarization rotation angle of the polarization rotator LC is related to the voltage applied thereto, the periodic square wave voltage applied to the polarization rotator LC may be generated by the field programmable gate array FPGA in the present embodiments to control the polarization rotator LC to modulate the polarization angle of the excitation light.

In other embodiments provided by the applicant, with the characteristics of the second excitation light having different light intensities with respect to the second polarizer PL2 with different polarization angles when passing through the second polarizer PL2, the second polarizer PL2 may be rotated to simulate a metal nanorod with different angles in space, and when the second polarizer is at different polarization angles, the avalanche photodiode APD and the field programmable gate array FPGA may also be configured to obtain the change information about the polarization angle of the second excitation light with the second polarizer at different polarization angles, so as to obtain a plurality of model characteristic curves, wherein each of the model characteristic curves corresponds to the change information about the polarization angle of the second excitation light at one polarization angle.

Figure 3:
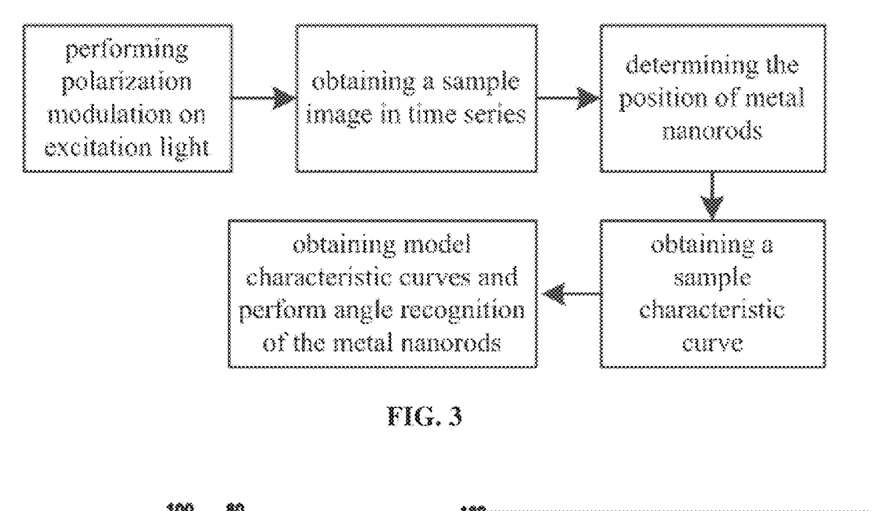
FIG. 3 is a schematic diagram of the process of recognizing the angle of a metal nanorod in a sample in some embodiments of the present disclosure.
Figure 4:
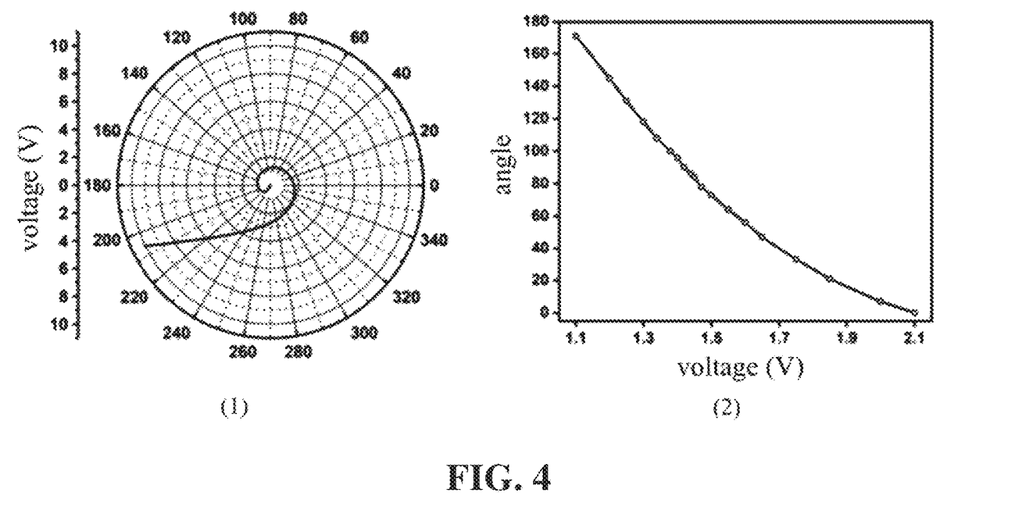
FIG. 4 is a schematic diagram of the angular deflection response of the polarization rotator to input voltages in polar and Cartesian coordinates.

Based on the optical structure of the microscopic imaging system, a method of recognizing an angle of a metal nanorod in a sample may also be provided in some embodiments of the present disclosure. Please refer to FIG. 3, a specific process of the method is described as follows:

(1) performing polarization modulation on the excitation light emitted by a laser with a polarization rotator LC;

The polarization rotator LC may be capable of performing deflection modulation on the incident light whose polarization direction is parallel to its optical axis, wherein the polarization direction of the incident light can be deflected by applying square wave or DC voltage. The angular deflection response of the polarization rotator to input voltages is shown in FIG. 4(1). It can be seen that with the increase of deflection angle, the input voltage required increases step by step, so does the response time. Therefore, in order to reduce the response time of the polarization rotator, in the shown embodiment, a field programmable gate array FPGA is used to generate a periodically changing square wave voltage with an amplitude range of 1.1-2.1V, a square wave frequency of 500 Hz, a voltage change step of 0.1V and a voltage change time of 5-50 ms for each step. The amplitude of the square wave voltage always cycles from 1.1 V to 2.1 V and then to 1.1 V; and the angular deflection of the polarization rotator within the amplitude range is basically linear, as shown in FIG. 4(2). The polarization angle of the polarization-modulated excitation light may be deflected from 0° to 171°, and can be continuously and periodically changed between two 0° to 171° cycles. The metal nanorod may be approximated as a dipole, producing the strongest signal only when the polarization direction of the excitation light matches the direction of its long axis. According to Marius' law: $I=I\_0 \cos(\theta)$, when the polarization direction of the excitation light is at an included angle $\theta$ with the direction of its long axis, the signal intensity generated I may meet the cosine relationship with the initial intensity $I\_0$. As the angle increases, the signal intensity may decrease gradually until the signal intensity decreases to 0 at $\theta=90°$. Therefore, when the metal nanorod with different angles are excited by the polarization-modulated excitation light, the periodic change of the intensity signal generated contains clear angle characteristics.

(2) obtaining a sample image in time series;

The camera sCMOS may capture the reflected light of the metal nanorod at high speed to obtain time series images with high time resolution. The data transfer time of the high-speed camera is less than 500 ms in a small imaging area. Considering the balance between exposure time and signal-to-noise (SNR) ratio, the high-speed camera in some embodiments can reach a time resolution of 5 ms per frame. With excellent sample SNR optimization, the time resolution can reach 3 ms per frame. In some embodiments of the present disclosure, the extremely high time resolution is sufficient for signal measurement under conditions of high-speed rotation of the polarization rotator.

(3) determining a corresponding position of the metal nanorod in the sample image;

The sample image in time series is first preprocessed (ImageJ) to determine the position of an individual metal nanorod in the sample image. Then, a circular region with the center of light intensity distribution as the center of the circle and N pixels as the radius is selected for subsequent analysis, so as to facilitate the subsequent extraction of the characteristic curve of light intensity change of the individual metal nanorod. N is taken as 10 in the shown embodiment; and N may be adjusted according to the actual situation in other embodiments.

(4) obtaining the sample characteristic curve; and

The variation of light intensity of the selected circular region with time is analyzed to draw the light intensity variation curve which is then taken as the sample characteristic curve.

(5) obtaining a plurality of model characteristic curves, and selecting one from the plurality of model characteristic curves for angle recognition of the metal nanorod.

Figure 5:
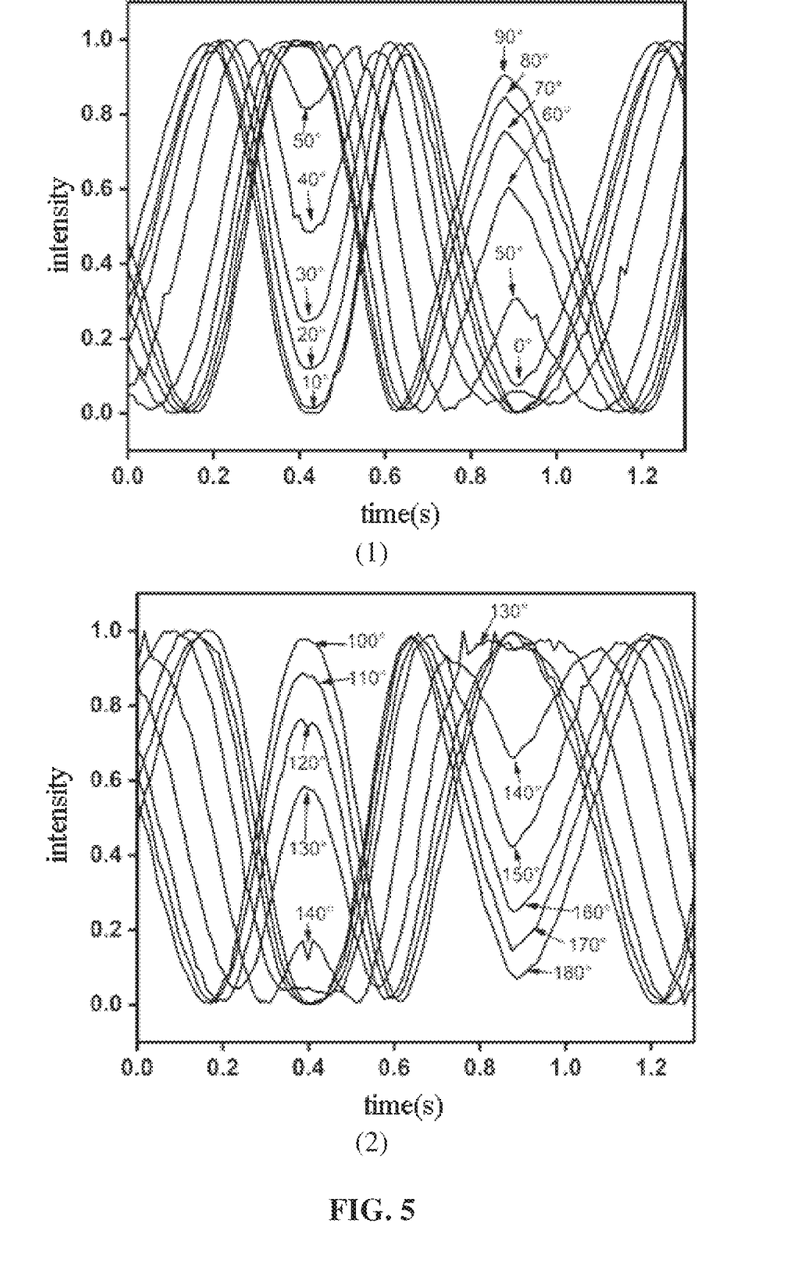
FIG. 5 is a schematic diagram of a plurality of model characteristic curves with different angles.

① The second polarizer PL2 selects and uses a linear polarizer with extinction ratio of 1000:1 as the "model dipole", and the second polarizer PL2 is rotated to simulate the metal nanorod at different angles in space. ② The characteristic curve of the "model dipole" under the polarization-modulated excitation light is measured. By rotating the second polarizer PL2 at an interval of 10° from 0° to 180°, 19 model characteristic curves at different angles were measured, as shown in (1) and (2) of FIG. 5 respectively. Clearly, the "model dipole" exhibits periodic changes of multi peaks, where each angle corresponds to a unique curve waveform, and the curve waveform difference between adjacent angles is large enough to completely meet the angular resolution of 10°. ③ The collected characteristic curve of the metal nanorod is compared with each of the model characteristic curves, and during the comparison, the root mean square error (RMSE) is calculated by appropriate segments of two curves, a model characteristic curve with the smallest RMSE is obtained by enumerating the segments of all model characteristic curves compared with the characteristic curve of the metal nanorod, and the angle corresponding to the model characteristic curve with the smallest RMSE is outputted as the angle information about the metal nanorod to be identified. Therefore, with the recognized angle information about each metal nanorod in the sample image, an angle distribution image can be produced, helping detection of the angle distribution of metal nanorods in a region. This can further improve the time resolution to monitor rotary dynamics of the metal nanorod. In addition, the changes of the surrounding environment can also be analyzed by analyzing the angle changes of the metal nanorods used as environmental probes. When the metal nanorods are combined with a cell membrane, various biological processes and properties of the cell membrane can also be detected.

The angle recognition method for metal nanorods provided in the above embodiments can be implemented in a processor that is in a signal connection with the camera cMOS and the field programmable gate array FPGA.

It shall be understood by those skilled in the art that the method provided in the embodiments of the present disclosure can also recognize the angular distribution of fluorescent molecules in a sample in space, and when a beam of linearly polarized light excites fluorescent molecules, the fluorescent molecules can absorb the photon only when the polarization direction of the excitation light matches (is parallel to) the direction of the transition dipole moment of the fluorescent molecules. When the polarization direction of the linearly polarized light is perpendicular to the direction of the transition dipole moment of the fluorescent molecules, the fluorescent molecules will not absorb the photon. This is the "law of photoselection" of the fluorescent molecules, which is shared by almost all common fluorescent molecules. It is accordingly consistent with the recognition method of metal nanorods; and the direction of the transition dipole moment of the fluorescent molecules can be effectively recognized by using the angle recognition method disclosed in the above embodiments. The direction of the transition dipole moment of the fluorescent molecules is usually fixed, so the angular distribution of fluorescent molecules in space can be known by detecting the direction of the transition dipole moment.

Figure 6:
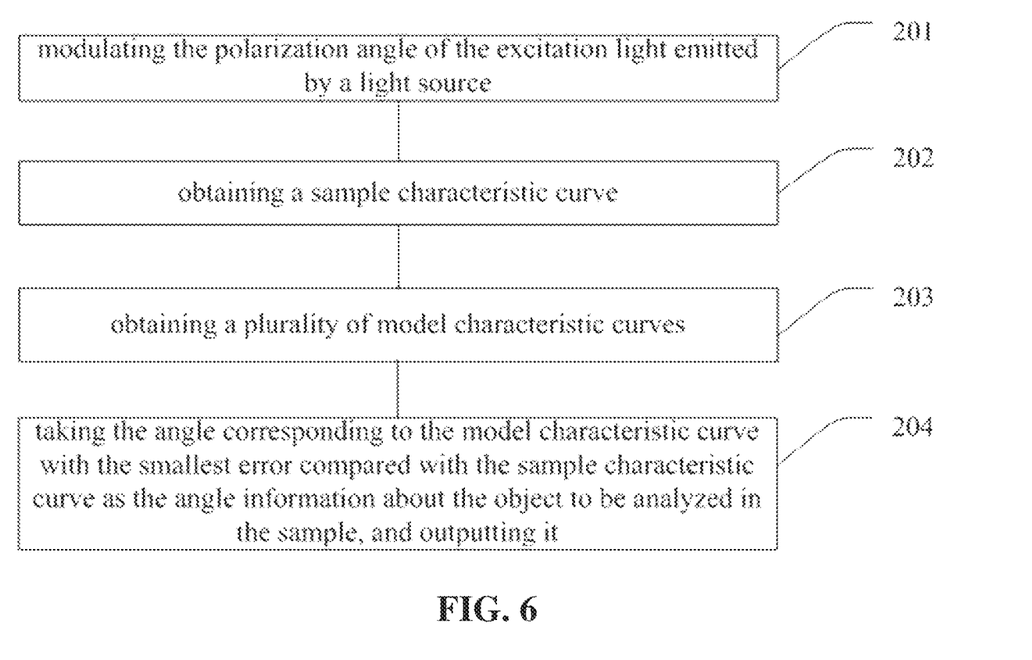
FIG. 6 is a schematic diagram of a flowchart of a microscopic imaging method for recognizing an angle of a sample angle recognition in some embodiments of the present disclosure.

Based on the angle recognition method for an object to be analyzed (metal nanorods, fluorescent molecules) in a sample by the microscopic imaging system, please refer to FIG. 6, a microscopic imaging method for recognizing an angle of a sample is also provided in some embodiments of the present disclosure, which is executed in a processor and applied to the microscopic imaging system provided by the above embodiments. The microscopic imaging method for recognizing an angle of a sample may include steps 201 to 203, which are described in detail below.

Step 201: modulating the polarization angle of the excitation light emitted by the light source 102, and outputting the polarization-modulated excitation light; the polarization angle of the polarization-modulated excitation light being changed continuously and cyclically within a preset angle range.

Step 202: acquiring the intensity of fluorescence or reflected light emitted by an object to be analyzed in a sample detected by the imaging device 106 after being excited by the first excitation light to obtain a sample characteristic curve;

wherein, said acquiring the intensity of fluorescence or reflected light emitted by an object to be analyzed in a sample detected by the imaging device 106 after being excited by the first excitation light to obtain a sample characteristic curve may include:

Step 2021: obtaining a sample image in time series, and from the sample image in time series, selecting a circular region with the center of light intensity distribution as the center and a preset number of pixels of the radius;

Step 2022: analyzing the variation of light intensity with time for the selected circular region, and plotting a light intensity variation curve as a sample characteristic curve;

Step 203: obtaining a plurality of model characteristic curves, the plurality of model characteristic curves being the change information about the polarization angle of the second excitation light when the second polarizer PL2 at different polarization angles; and Step 204: calculating the error between each of the model characteristic curves and the sample characteristic curve, taking the angle corresponding to the model characteristic curve with the smallest error compared with the sample characteristic curve as the angle information about the object to be analyzed in the sample, and outputting the angle information about the object to be analyzed in the sample.

It should be noted that the specific embodiments of the above steps of the method have been described in detail above, and will not be repeated here.

It shall be understood by those skilled in the art that all or part of the functions of the methods in the above embodiments can be implemented either by means of hardware or computer programs. When all or part of the functions in the above embodiments are realized by a computer program, the program may be stored in a computer-readable storage medium, which may include a read-only memory, a random access memory, a magnetic disk, an optical disk, a hard disk, and so on. The program may be executed by a computer to achieve the above functions. For example, when the program is stored in the memory of a device, all or part of the above functions may be achieved when the program in the memory is executed by the processor. In addition, when all or part of the functions in the above embodiment are implemented by a computer program, the program may also be stored in a storage medium such as a server, another computer, a disk, optical disk, a flash disk, or a portable hard drive, and all or part of the functions in the above embodiment may be realized when the program in the memory is executed by a processor by downloading or copying it to the memory of the local device, or by updating the version of the system of the local device.

The present disclosure is described and illustrated by means of the above specific examples to only help understand the technical solution of the present disclosure, and not to limit thereto. For those skilled in the art, a number of simple deduction, deformation or replacement can also be made according to the idea of the present disclosure.

What is claimed is:

1. A microscopic imaging system, comprising:
   an object stage for carrying a sample, wherein an object to be analyzed in the sample having a polarized light response;
   a light source for providing an excitation light to excite the sample;
   a polarization rotation device for modulating a polarization angle of the excitation light to obtain a polarization-modulated excitation light, a polarization angle of the polarization-modulated excitation light being changed continuously and cyclically within a preset angle range;
   a beam splitting device for splitting the polarization-modulated excitation light into two parts including a first excitation light and a second excitation light;
   an imaging device for detecting an intensity of fluorescence or reflected light emitted by the object to be analyzed in the sample after being excited by the first excitation light, the intensity of fluorescence or reflected light being related to a polarization angle of the first excitation light;
   a polarization detection device for detecting change information about a polarization angle of the second excitation light to obtain polarization change information of the polarization-modulated excitation light, the polarization detection device comprising a second polarizer through which the second excitation light passes, the polarization detection device being configured to, in a case of the second polarizer being at different polarization angles, detect the change information about the polarization angle of the second excitation light where the second polarizer is at different polarization angles so as to obtain a plurality of model characteristic curves, each of the model characteristic curves corresponding to the change information about the polarization angle of the second excitation light at one polarization angle; and
   a processor for:
   obtaining from the imaging device a detected intensity of fluorescence or reflected light emitted by the object to be analyzed in the sample after being excited by the first excitation light to obtain a sample characteristic curve;
   obtaining the plurality of model characteristic curves detected by the polarization detection device; and
   calculating an error between each of the model characteristic curves and the sample characteristic curve, taking a polarization angle corresponding to a model characteristic curve with a minimum error compared with the sample characteristic curve as angle information about the object to be analyzed in the sample, and outputting the angle information about the object to be analyzed in the sample.

2. The microscopic imaging system according to claim 1, wherein the polarization rotation device comprises:
   a polarization rotator for modulating the polarization angle of the excitation light according to a magnitude of an electrical signal applied thereto such that the polarization angle of the polarization-modulated excitation light is changed continuously and cyclically within the preset angle range, wherein the polarization angle of the excitation light is increasing according to the magnitude of the electrical signal applied from small to large, and the electrical signal comprises a square wave signal or a DC voltage signal.

3. The microscopic imaging system according to claim 2, wherein the polarization rotation device further comprises:
   a first polarizer arranged in front of the polarization rotator in a propagating direction of the excitation light and configured to adjust a polarization direction of the excitation light to match an optical axis direction of the polarization rotator.

4. The microscopic imaging system according to claim 1, wherein the beam splitting device comprises a non-polarized beam splitter.

5. The microscopic imaging system according to claim 2, wherein the polarization detection device further comprises a third lens, an avalanche photodiode and a field programmable gate array; and the second excitation light is directed to the avalanche photodiode after passing through the second polarizer and the third lens in turn;
   the second polarizer is configured to assist the avalanche photodiode to detect a light intensity of the second excitation light, wherein as a polarization direction of the second excitation light is changed from being parallel to perpendicular to a polarization direction of the second polarizer, the light intensity of the second excitation light after passing through the second polarizer is changed from maximum to minimum;

the third lens is configured to focus the second excitation light after passing through the second polarizer onto a center of the avalanche photodiode;

the avalanche photodiode is configured to convert change information about the light intensity of the second excitation light after passing through the second polarizer into a corresponding electrical signal with polarization angle information;

the field programmable gate array is configured to read and record the electrical signal with polarization angle information, and determine the change information about the polarization angle of the second excitation light; and the field programmable gate array is further configured to generate a periodic square wave voltage applied to the polarization rotator so as to control the polarization rotator to modulate the polarization angle of the excitation light.

6. The microscopic imaging system according to claim 5, wherein the second polarizer is further configured to simulate a sample model; and in the case of the second polarizer being at different polarization angles, the avalanche photodiode and the field programmable gate array are further configured to obtain the change information about the polarization angle of the second excitation light where the second polarizer is at different polarization angles so as to obtain a plurality of model characteristic curves.

7. The microscopic imaging system according to claim 1, wherein the imaging device comprises a camera configured to capture a change of light intensity of fluorescence or reflected light emitted by the object to be analyzed in the sample after being excited by the first excitation light so as to obtain a sample image in time series; and said obtaining from the imaging device the detected intensity of fluorescence or reflected light emitted by the object to be analyzed in the sample after being excited by the first excitation light to obtain a sample characteristic curve comprises:

obtaining the sample image in time series, and selecting, from the sample image in time series, a circular region with a center of light intensity distribution as a center thereof and a preset number of pixels as a radius thereof; and analyzing a variation of light intensity with time in a selected circular region, drawing a light intensity variation curve, and taking the light intensity variation curve as the sample characteristic curve.

8. The microscopic imaging system according to claim 1, further comprising:

a filtering and beam-expanding device arranged on an optical path between the light source and the polarization rotation device and configured to filter and expand the excitation light.

9. A microscopic imaging method for sample angle recognition, applied to a microscopic imaging system that comprises:

an object stage for carrying a sample, wherein an object to be analyzed in the sample having a polarized light response;

a light source for providing an excitation light to excite the sample;

a polarization rotation device for modulating a polarization angle of the excitation light to obtain a polarization-modulated excitation light, a polarization angle of the polarization-modulated excitation light being changed continuously and cyclically within a preset angle range;

a beam splitting device for splitting the polarization-modulated excitation light into two parts including a first excitation light and a second excitation light;

an imaging device for detecting an intensity of fluorescence or reflected light emitted by the object to be analyzed in the sample after being excited by the first excitation light, the intensity of fluorescence or reflected light being related to a polarization angle of the first excitation light; and a polarization detection device for detecting change information about a polarization angle of the second excitation light to obtain polarization change information of the polarization-modulated excitation light, the polarization detection device comprising a second polarizer through which the second excitation light passes;

the method comprising:

modulating a polarization angle of the excitation light emitted by the light source and outputting a polarization-modulated excitation light, a polarization angle of the polarization-modulated excitation light being changed continuously and cyclically within a preset angle range;

obtaining from the imaging device the detected intensity of fluorescence or reflected light emitted by the object to be analyzed in the sample after being excited by the first excitation light to obtain a sample characteristic curve;

in a case of the second polarizer being at different polarization angles, obtaining from the polarization detection device a detected change information about the polarization angle of the second excitation light so as to obtain a plurality of model characteristic curves, the model characteristic curves being corresponding to the polarization angles of the second polarizer one by one, and each of the model characteristic curves corresponding to the change information about the polarization angle of the second excitation light at one polarization angle; and calculating an error between each of the model characteristic curves and the sample characteristic curve, taking a polarization angle corresponding to a model characteristic curve with a minimum error compared with the sample characteristic curve as angle information about the object to be analyzed in the sample, and outputting the angle information about the object to be analyzed in the sample.

10. The microscopic imaging method according to claim 9, wherein the imaging device comprises a camera configured to capture a change of light intensity of fluorescence or reflected light emitted by the object to be analyzed in the sample after being excited by the first excitation light so as to obtain a sample image in time series; and said obtaining from the imaging device the detected intensity of fluorescence or reflected light emitted by the object to be analyzed in the sample after being excited by the first excitation light to obtain a sample characteristic curve comprises:

obtaining the sample image in time series, and selecting, from the sample image in time series, a circular region with a center of light intensity distribution as a center thereof and a preset number of pixels as a radius thereof; and analyzing a variation of light intensity with time in a selected circular region, plotting a light intensity variation curve, and taking the light intensity variation curve as the sample characteristic curve.

11. A microscopic imaging method for recognizing an angle of a sample, applied to the microscopic imaging system according to claim 1, the method comprising:

modulating a polarization angle of the excitation light emitted by the light source and outputting a polarization-modulated excitation light, a polarization angle of the polarization-modulated excitation light being changed continuously and cyclically within a preset angle range;

obtaining from the imaging device the detected intensity of fluorescence or reflected light emitted by the object to be analyzed in the sample after being excited by the first excitation light to obtain a sample characteristic curve;

in a case of the second polarizer being at different polarization angles, obtaining from the polarization detection device the detected change information about the polarization angle of the second excitation light so as to obtain a plurality of model characteristic curves, the model characteristic curves being corresponding to the polarization angles of the second polarizer one by one, and each of the model characteristic curves corresponding to the change information about the polarization angle of the second excitation light at one polarization angle; and calculating an error between each of the model characteristic curves and the sample characteristic curve, taking a polarization angle corresponding to a model characteristic curve with a minimum error compared with the sample characteristic curve as angle information about the object to be analyzed in the sample, and outputting the angle information about the object to be analyzed in the sample.

* * * * *